(12) United States Patent
Ikeda et al.

(10) Patent No.: US 7,660,309 B2
(45) Date of Patent: Feb. 9, 2010

(54) STORAGE FUNCTION METHOD AND APPARATUS IN A PASSIVE OPTICAL NETWORK

(75) Inventors: Hiroki Ikeda, Hachioji (JP); Na Zhang, Beijing (CN)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 11/650,428

(22) Filed: Jan. 8, 2007

(65) Prior Publication Data
US 2007/0230471 A1 Oct. 4, 2007

(30) Foreign Application Priority Data
Mar. 31, 2006 (CN) .................... 2006 1 0071065

(51) Int. Cl.
*H04L 12/56* (2006.01)
(52) U.S. Cl. ...................... 370/392; 370/254
(58) Field of Classification Search ............... 370/390, 370/255, 392, 395, 437, 470; 398/71, 63, 398/58, 69
See application file for complete search history.

(56) References Cited

U.S. PATENT DOCUMENTS

| | | | | |
|---|---|---|---|---|
| 6,636,527 B1 * | 10/2003 | Lee et al. | ..................... | 370/465 |
| 6,856,623 B2 * | 2/2005 | Hamasaki et al. | ........... | 370/390 |
| 6,970,461 B2 * | 11/2005 | Unitt et al. | .................. | 370/390 |
| 7,286,538 B2 * | 10/2007 | Song et al. | .................. | 370/392 |
| 7,330,654 B2 * | 2/2008 | Song et al. | .................... | 398/71 |
| 7,403,477 B2 * | 7/2008 | Takeuchi et al. | ............ | 370/230 |
| 7,418,009 B2 * | 8/2008 | Tominaga et al. | ........... | 370/470 |
| 7,480,295 B2 * | 1/2009 | Sung et al. | .................. | 370/390 |
| 7,483,632 B2 * | 1/2009 | Sung et al. | .................... | 398/63 |
| 7,493,043 B2 * | 2/2009 | Saito et al. | .................... | 398/71 |
| 7,567,564 B2 * | 7/2009 | Tanaka | ........................ | 370/389 |
| 2003/0084191 A1 * | 5/2003 | Yamamoto | .................. | 709/249 |

(Continued)

OTHER PUBLICATIONS

ITU-T "Broadband Optical Access Systems Based on Passive Optical Networks (PON)", International Telecommunication Union, Series G: Transmission Systems and Media, Digital Systems and Networks, Oct. 1998, pp. 1-54.

(Continued)

*Primary Examiner*—Thong H Vu
(74) *Attorney, Agent, or Firm*—Stites & Harbison PLLC; Juan Carlos A. Marquez, Esq.

(57) ABSTRACT

A method and an apparatus for implementing a storage function in a passive optical network (PON) system. On the basis of a LINK ID held by the data, data requiring storage, e.g. data making exclusive use of a wide bandwidth such as audiovisual data and large-volume data packages, are determined among all the data sent to an optical network unit. These data requiring storage are stored in a storage device installed in the optical network unit. In case the user requests data stored in the storage device, the stored data are transferred directly to the user, without any need to request and send these data for the second time via an IPTV server and the core network. It is possible to avoid duplicate transfers of data, and in particular to avoid duplicate transfers of data making exclusive use of a comparatively wide bandwidth such as audiovisual data and large-volume data packages, to improve the utilization factor of the downlink bandwidth, and to reduce flow congestion and data delays.

18 Claims, 13 Drawing Sheets

U.S. PATENT DOCUMENTS

| | | | |
|---|---|---|---|
| 2003/0091045 A1* | 5/2003 | Choi et al. | 370/390 |
| 2005/0019033 A1* | 1/2005 | Oh et al. | 398/58 |
| 2005/0083950 A1* | 4/2005 | Choi et al. | 370/395.53 |
| 2005/0094660 A1* | 5/2005 | Lee et al. | 370/437 |
| 2006/0126643 A1* | 6/2006 | Satou et al. | 370/395.53 |
| 2006/0127091 A1* | 6/2006 | Yoo et al. | 398/69 |
| 2007/0101390 A1* | 5/2007 | Bernard et al. | 725/129 |
| 2007/0109974 A1* | 5/2007 | Cutillo et al. | 370/254 |
| 2007/0274718 A1* | 11/2007 | Bridges et al. | 398/63 |
| 2007/0297349 A1* | 12/2007 | Arkin | 370/255 |
| 2008/0144622 A1* | 6/2008 | Platnic | 370/390 |

OTHER PUBLICATIONS

ITU-T "A Broadband Optical Access Systems With Increased Service Capability Using Dynamic Bandwidth Assignment", International Telecommunication Union, Series G: Transmission Systems and Media, Digital Systems and Networks, Nov. 2001, pp. 1-82.

* cited by examiner

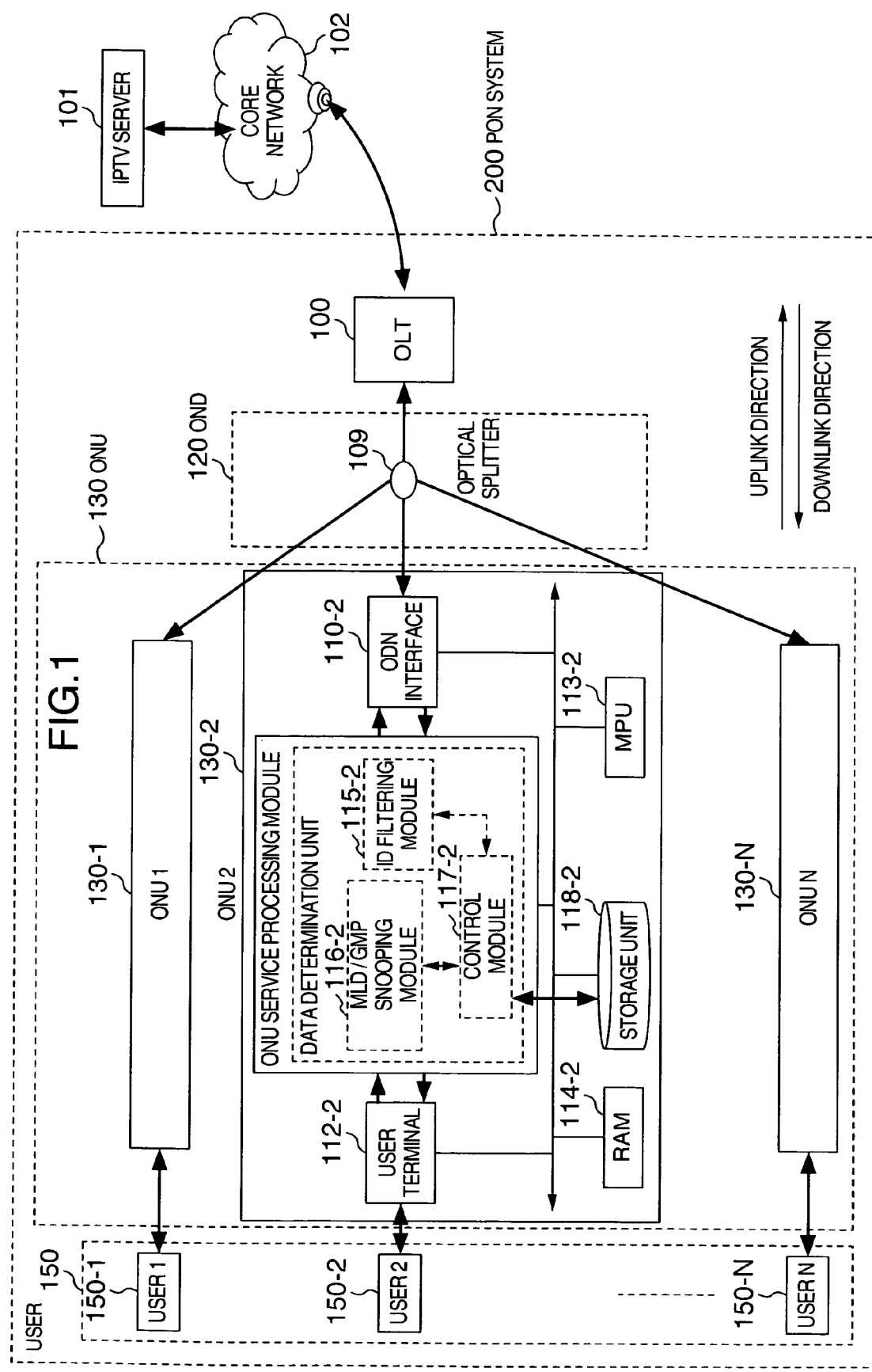

DOWNLINK ITU-T G.983.1 APON FRAME STRUCTURE

ATM CELL STRUCTURE

DOWNLINK 802.3ah EPON FRAME STRUCTURE

ETHERNET FRAME STRUCTURE

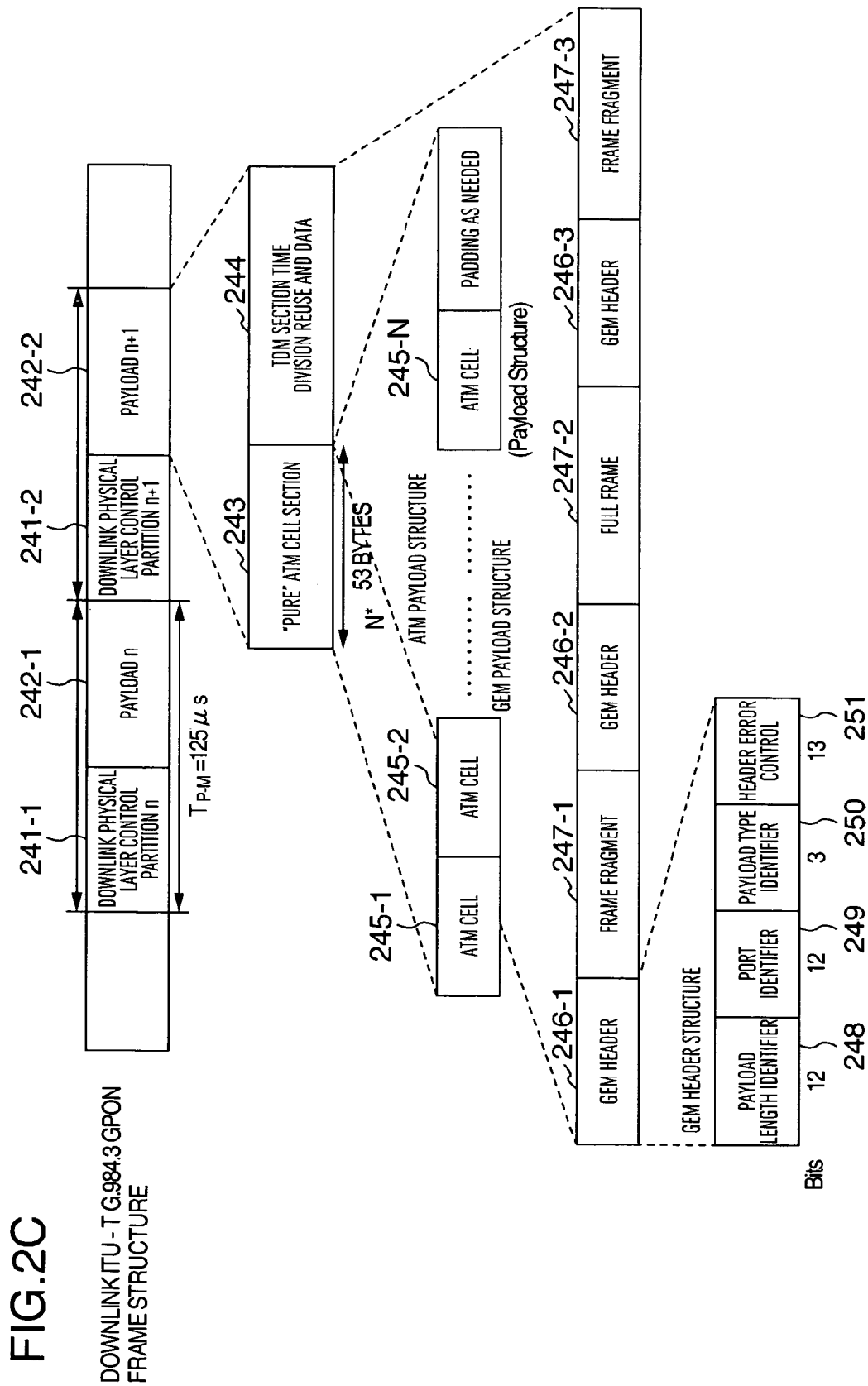

FIG.4A
LINK ID COMPARISON TABLE

| | DATA LIST | LINK ID CORRESPONDING TO DATA | STORAGE POSSIBLE IN CONCERNED ONU ? |
|---|---|---|---|
| 1 | DATA1 | 1 | POSSIBLE |
| 2 | DATA3 | 2 | POSSIBLE |
| 3 | DATA4 | 1 | POSSIBLE |
| 4 | DATA5 | 5 | IMPOSSIBLE |

~120

FIG.4B
IP ADDRESS / PORT NUMBER COMPARISON TABLE

| | DATA LIST | IP ADDRESS / PORT NUMBER CORRESPONDING TO DATA | STORAGE POSSIBLE IN CONCERNED ONU ? |
|---|---|---|---|
| 1 | DATA1 | 192.168.25.* | POSSIBLE |
| 2 | DATA3 | 2 | POSSIBLE |
| 3 | DATA4 | 1 | POSSIBLE |
| 4 | DATA5 | 192.168.10.* | IMPOSSIBLE |

CONTENT COMPARISON TABLE

| | UUSER REQUEST LIST | DATA STORAGE LIST |
|---|---|---|
| 1 | REQUEST 1 | DATA1 |
| 2 | REQUEST 2 | DATA3 |
| 3 | REQUEST 5 | DATA4 |
| 4 | | DATA5 |

| | STORAGE LIST |
|---|---|
| 1 | DATA1 |
| 2 | DATA3 |
| 3 | DATA4 |
| 4 | DATA5 |

~118

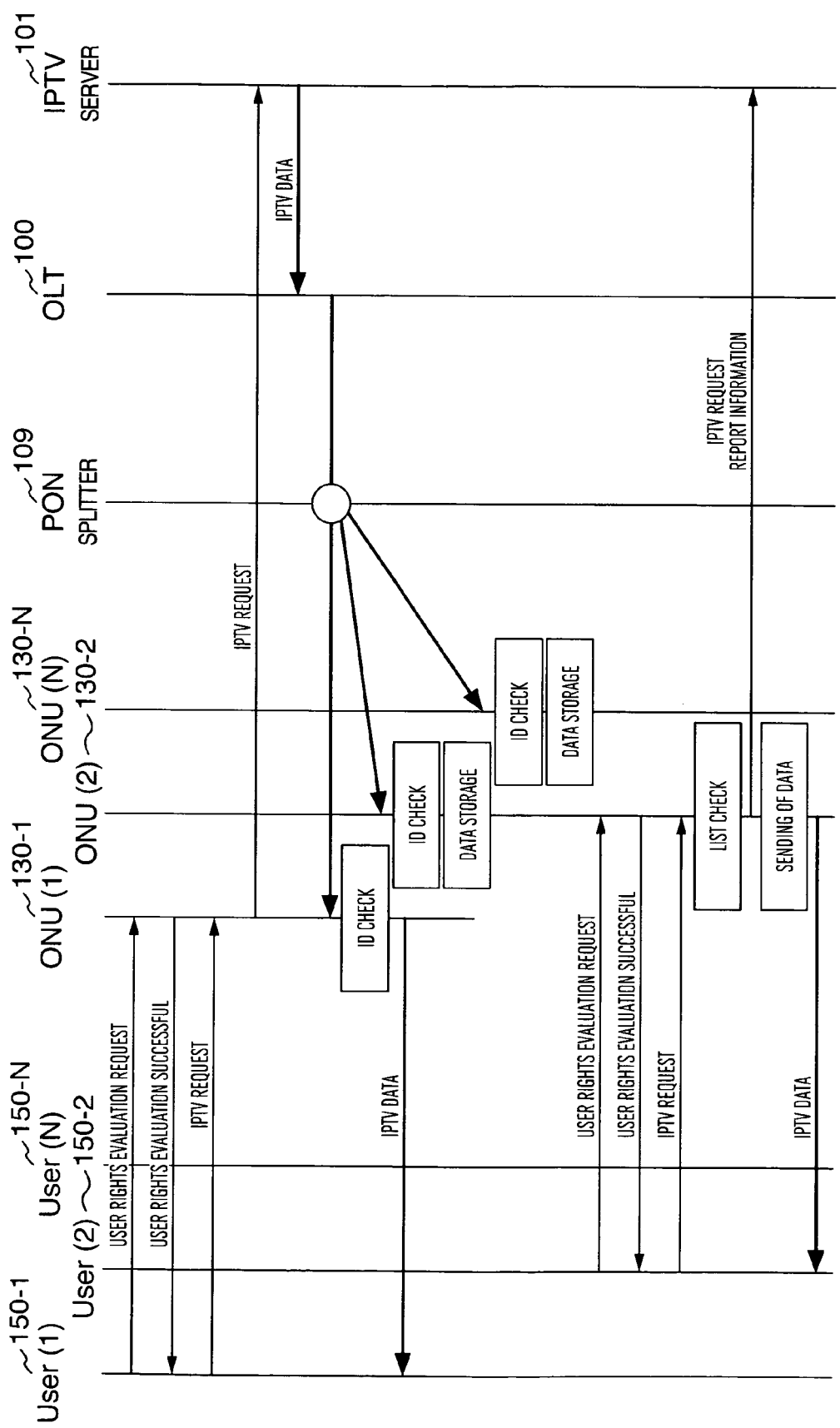

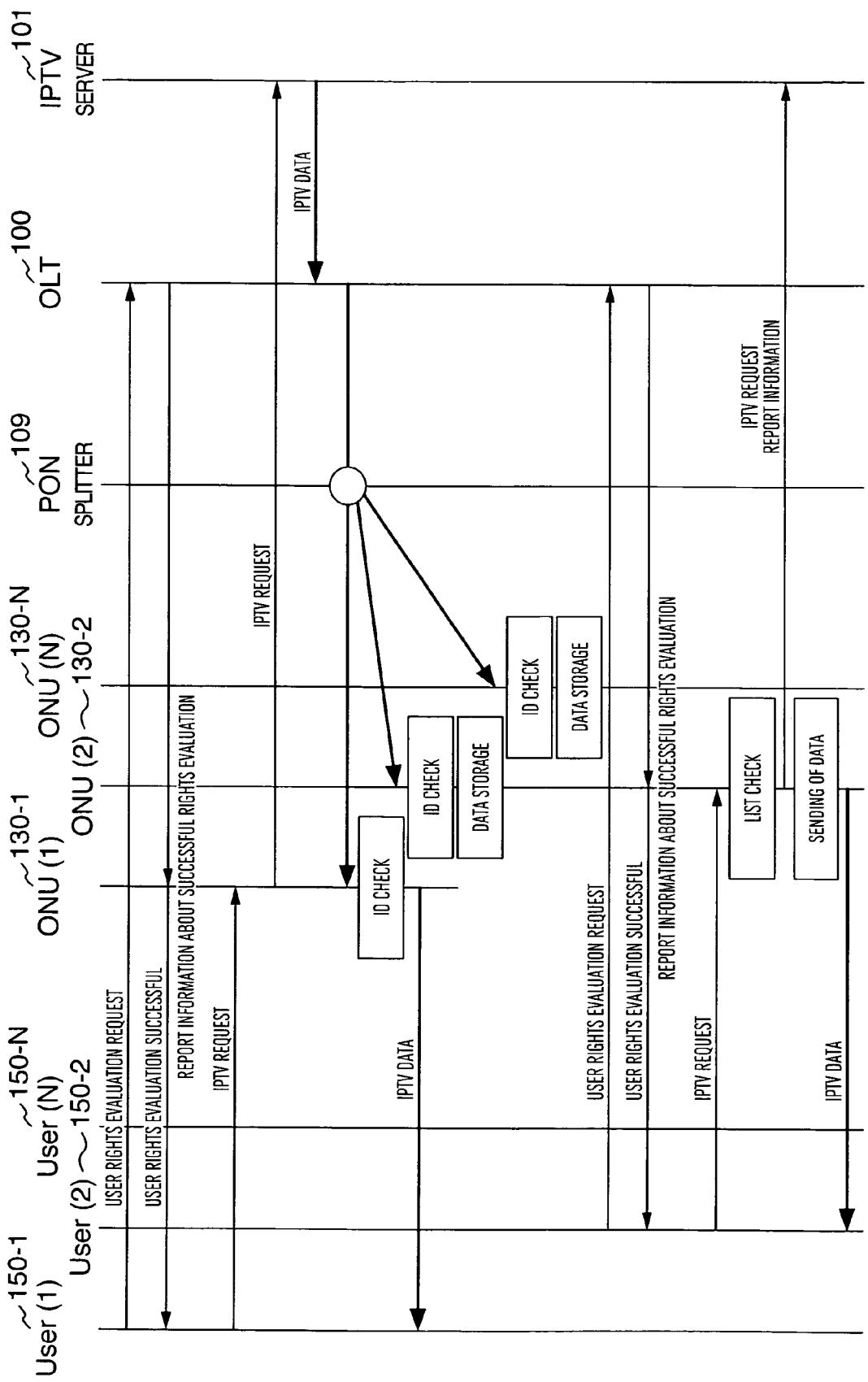

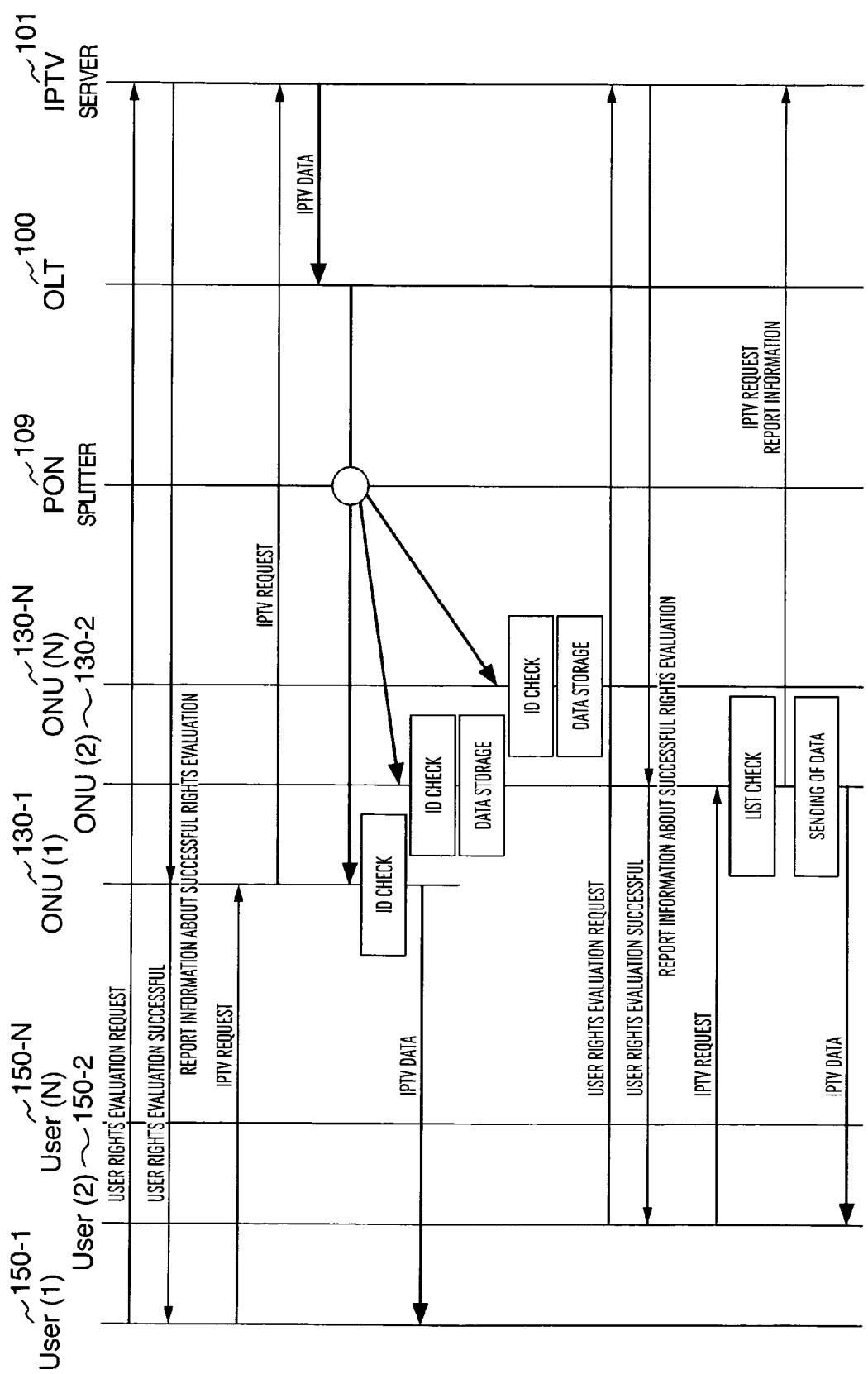

OLT

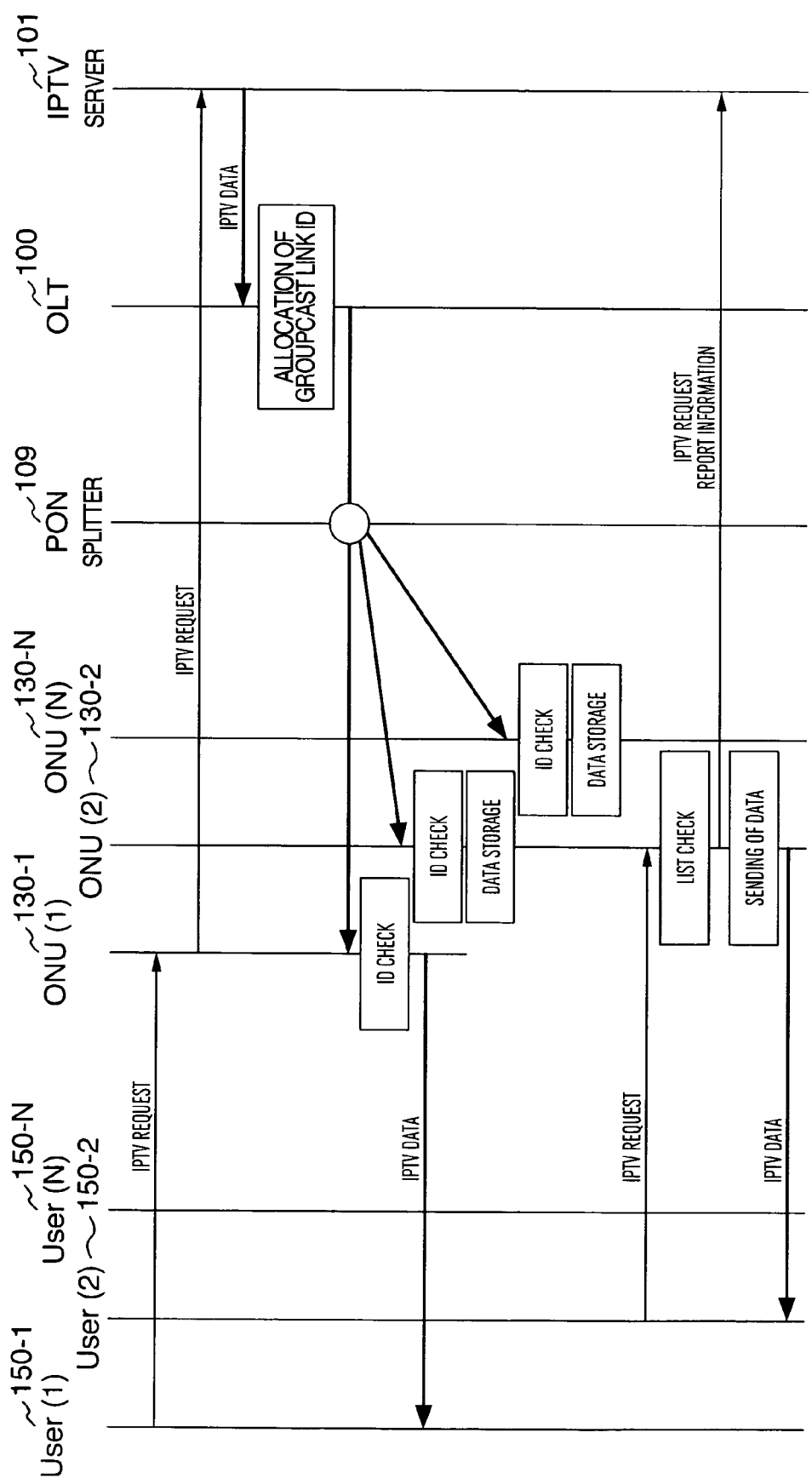

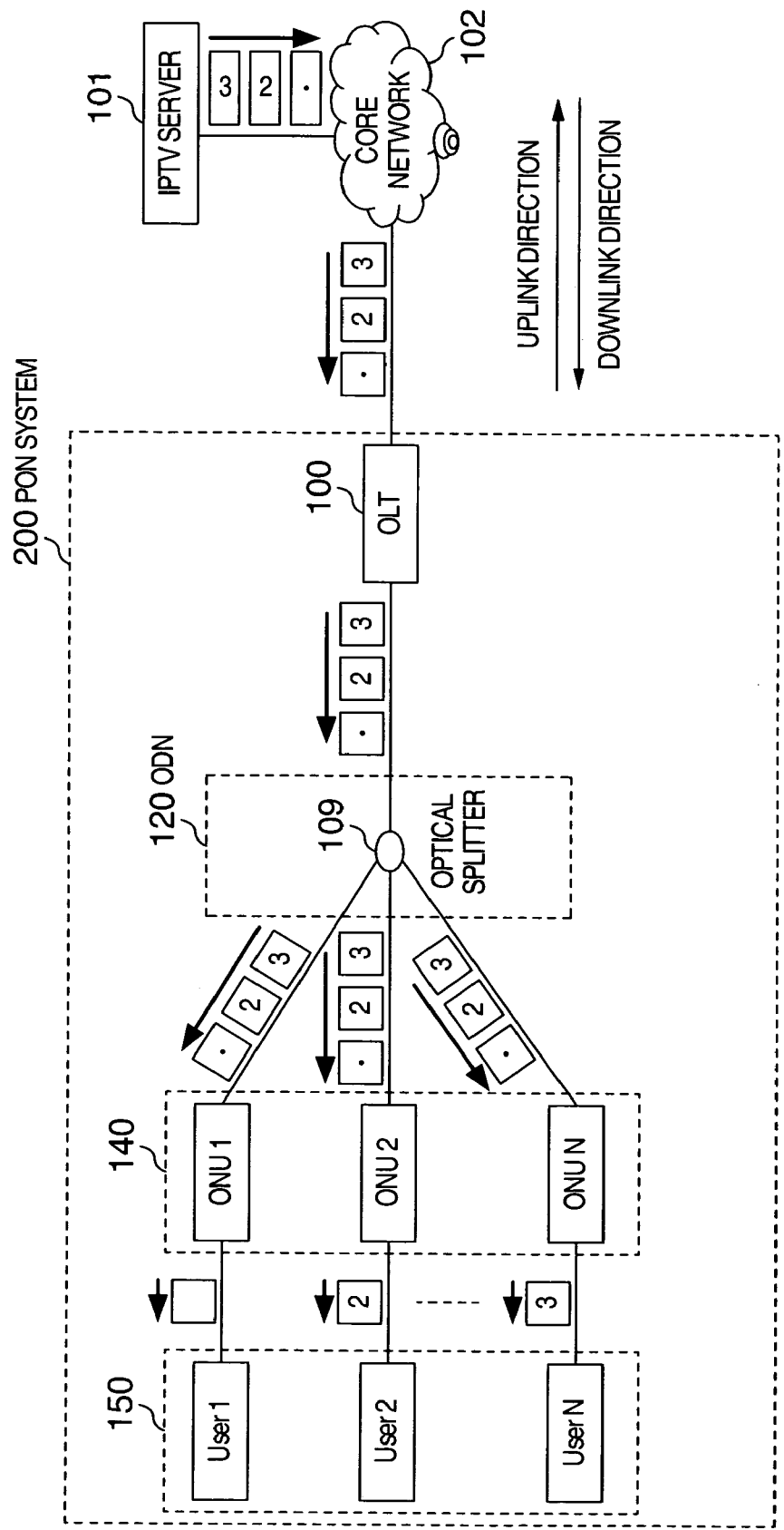

STORAGE FUNCTION METHOD AND APPARATUS IN A PASSIVE OPTICAL NETWORK

CLAIM OF PRIORITY

The present application claims priority from Chinese Application CN 200610071065.0, filed on Mar. 31, 2006, the contents of which are hereby incorporated by reference into this application.

BACKGROUND OF THE INVENTION

The present invention is one related to a method and equipment for implementing a storage function in a passive optical network system and which, in concrete terms, by utilizing a storage device installed in an optical network unit within the passive optical network system, stores data making exclusive use of a comparatively wide bandwidth such as e.g. audiovisual data, and transfers the data stored in the aforementioned storage device to the user.

Since a Passive Optical Network (PON) has advantages like long distance capability, wide bandwidth, and low cost, it is already used as one of the most effective methods for end users connected to a network. A passive optical network system has an extended structure of the tree type or the like. FIG. 12 is a structural drawing of a basic passive optical network with current technology. As shown in FIG. 12, there are included in a PON system an optical line terminal (OLT) 100, an optical distribution network (ODN) 120, and multiple optical network units (ONU) 140, and the like, and the system is capable of provide services such as voice and audiovisual communications between an end user 150 and a core network 102.

ITU-T Recommendation G.983 recommends letting a PON system have a point-to-multipoint extended structure, making it pass through a passive optical distribution network between an OLT and a plurality of ONUs, and connecting it to e.g. an optical splitter. Different transfer methods are used for data transfers in the uplink and downlink directions within a PON, a broadcast method being used in the downlink direction, i.e. in the direction from the OLT to each ONU, since there are normally no restrictions with respect to bandwidth allocation in the downlink direction, i.e. the direction from the OLT to the ONUs, but as for the uplink direction from the ONUs to the OLT, an allocation of the bandwidth becomes necessary in order to avoid collisions and congestion.

As shown in FIG. 12, the data in the downlink direction from OLT 100 to ONU 140 are transferred with a broadcast method via an optical splitter 109 inside ODN 120 to each ONU in the downlink direction. Subsequently, through an analysis of the original data, each ONU receives the data affiliated with its own data.

In actual applied processes, the downlink bandwidth in the downlink direction of the PON system has been recognized to be generally very limited, at 155.52 Mbps, 622.08 Mbps, 1.25 Gbps, and 2.4 Gbps. Since there is not any restriction with respect to the allocation of bandwidth for the downlink direction, the downlink bandwidth is shared by all ONUs, so for this reason, the downlink flow of this system becomes very big and there exist problems such as flow congestion and data delays. Normally, the major portion of the downlink bandwidth is used exclusively by audiovisual services such as Internet Protocol Television (IPTV), IPTV groupcast services being particularly notable. Transferring the same audiovisual contents at different times to users with different ONUs can be said to a kind of waste from the perspective of the network as a whole.

In order to solve the aforementioned problem, precisely audiovisual data are stored in locally distributed audiovisual servers installed between the core network and the connection networks, one method of which is presented in Patent Reference U.S. Pat. No. 5,550,577. To put it concretely, one video on demand network (VODN) transfers, based on a control signal sent from a user, audiovisual information to the user. In order to reduce duplication expenses of the audiovisual information, there is a need for this video on demand network to maintain one extremely big audiovisual database in a central audiovisual server, and if comparatively popular audiovisual data are stored in a locally distributed audiovisual server, it is possible for the locally distributed audiovisual server to provide direct audiovisual information to the user by proceeding in this way.

However, the method presented in Patent Reference U.S. Pat. No. 5,550,577A can only solve the problem of bandwidth waste in the core network portion of the downlink bandwidth and is unable to solve the problem of bandwidth waste in the connection network (such as PON) portion of the downlink bandwidth.

Currently, the problems mentioned hereinafter exist in PON systems.

1. In case data making exclusive use of a comparatively wide bandwidth such as unicast data and big data packages are transferred with a PON system, it is only possible for the user of a designated ONU to receive data. In case the user of a different ONU requires the same data, these data are sent from an IPTV server to reach the user via the entire PON system, and in this case, the result is that the same data makes exclusive use of the downlink bandwidth of the PON system multiple times, leading to a kind of serious waste of the bandwidth resource.

2. Due to the fact that audiovisual data for groupcast method transfers occupy a comparatively wide bandwidth and a different ONU user can only receive the data at the same time, he cannot view these data (e.g. viewing an audiovisual program) at a different time. In other words, in case a markedly different ONU user wants to view the same program at a different time, there is a need to access the IPTV server multiple times, the result being that exclusive use is made of the downlink bandwidth multiple times, leading to serious waste of the bandwidth resource.

SUMMARY OF THE INVENTION

The present invention was submitted taking the aforementioned problems into consideration, the present invention having for an object to provide an implementation method of making a PON system store data, to avoid as far as possible duplicate transfers of data by ONUs within the PON system and, in particular, to avoid duplicate transfers of data making exclusive use of a comparatively wide bandwidth such as audiovisual data and big data packages, improve the utilization factor of the downlink bandwidth, and make it possible to reduce the congestion of information flow and data delays.

In order to implement the aforementioned objects, the present invention devises a method of making a passive optical network system store data, there being included in the aforementioned passive optical network (PON) system therein a distribution network ODN, an optical line terminal OLT, and at least one optical network unit ONU, and there being in addition included a determination step of determining the data requiring storage, from among all data sent to the optical network unit, on the basis of at least all LINK IDs present in the data, a storage step of storing the aforementioned data requiring storage in a storage device installed in the aforementioned optical network unit, and the like. As for said data requiring storage in the aforementioned data determination step therein, the data judged to be audiovisual data are included on the basis of the IP address and/or the port number of the data.

The present invention is an optical network unit within the passive optical network system, there being included in the aforementioned passive optical network (PON) system therein a distribution network ODN; an optical line terminal OLT; and at least one optical network unit ONU;

a data determination unit determining, on the basis of all LINK IDs present in the data of at least one of the optical network units among the aforementioned optical network units, the data requiring storage from among all data sent to the optical network unit;

a storage device storing data requiring storage selected and determined with the aforementioned data determination unit; and the like. As for the aforementioned data requiring storage, audiovisual data are included, it being judged whether or not the concerned data are audiovisual data on the basis of the IP address and/or the port number.

In the passive optical network system of the present invention, there are included in the passive optical network (PON) system: a distribution network ODN, an optical line terminal OLT, and at least one optical network unit ONU; there existing a LINK ID allocation module allocating the LINK ID of the groupcast with respect to the data requiring storage in the aforementioned optical line terminal; and all the aforementioned data requiring storage in all optical network units being sent with a broadcast method. In at least one optical network unit of the aforementioned optical network units, there are included: a data determination unit determining the aforementioned data requiring storage from among all data sent to the optical network unit, on the basis of all LINK IDs present in the data; a storage device storing the data requiring storage determined in the aforementioned data determination unit, and the like. In the data therein determined to be data requiring storage, audiovisual data are included. In the aforementioned optical line terminal, there is further included an audiovisual data determination module, and by means hereof, it is judged whether or not the concerned data are audiovisual data, on the basis of the IP address and/or the port number.

The present invention is an optical network unit within another kind of passive optical network system, there being included in the aforementioned passive optical network (PON) system therein: a distribution network ODN, an optical line terminal OLT, an optical network unit ONU, and the like; there being included in the aforementioned optical network unit an ODN interface receiving data from the aforementioned OLT; an ONU data processing module detecting LINK IDs from the received data; a user terminal sending data to the user, and the like; and there being further included a storage device storing the aforementioned received data. The aforementioned ONU data processing module validates, on the basis of indications and LINK ID information corresponding to data stored in the aforementioned storage device, the data requiring storage in the aforementioned received data. The data validated in the aforementioned ONU data processing module are stored in the aforementioned storage device. In case there is a data transmission request from the user, the aforementioned user terminal sends out the stored data.

In the optical network unit of the passive optical network system of the present invention, there is provided a storage device, and since data making exclusive use of a comparatively wide bandwidth, such as audiovisual data, are stored in advance in this storage device, it is possible, in case the user on the optical network unit requests these data, to avoid as far as possible, without making exclusive use of the downlink portion from the core network to the optical network unit multiple times, duplicate transfers of data such as audiovisual data which make exclusive use of a comparatively wide bandwidth, to improve the utilization factor of the downlink bandwidth, and to reduce congestion of the flow and data delays.

BRIEF DESCRIPTION OF THE DRAWINGS

FIG. 1 is a structural frame diagram of a passive optical network system having a storage function, of the first embodiment of the present invention.

FIGS. 2A, 2B, and 2C are frame structure diagrams of downlink data of a passive optical network (PON) system.

FIG. 2A is a frame structure diagram of downlink data of a passive optical network system based on ATM (A-PON).

FIG. 2B is a frame structure diagram of downlink data of a passive optical network system based on Ethernet (E-PON).

FIG. 2C is a frame structure diagram of downlink data of a passive optical network system based on Jupiter (G-PON).

FIG. 4A is a comparison table of the LINK IDs inside the ID filtering module of the optical network unit of a passive optical network system of the first embodiment of the present invention.

FIG. 4B is a comparison table of the IP addresses/port numbers within the data determination unit of the optical network unit.

FIG. 4C is a content comparison table of the control module within the optical network unit.

FIG. 4D is a content list of the storage device inside the optical network unit.

FIG. 8A shows a process whereby the end user performs a rights evaluation by means of the ONU, in the second embodiment of the present invention.

FIG. 8B shows a process whereby the end user performs a rights evaluation by means of the OLT, in the second embodiment of the present invention.

FIG. 8C shows a process whereby the end user performs a rights evaluation by means of the IPTV server, in the second embodiment of the present invention.

FIG. 11 is a diagram of the transfer of basic information of a PON system wherein the OLT portion of the third embodiment in the present invention has a function of allocating one groupcast LINK ID to data requiring storage and the ONU has a storage device.

FIG. 12 is a structural diagram of a basic passive optical network with current technology.

DETAILED DESCRIPTION OF THE INVENTION

Figure 2A:
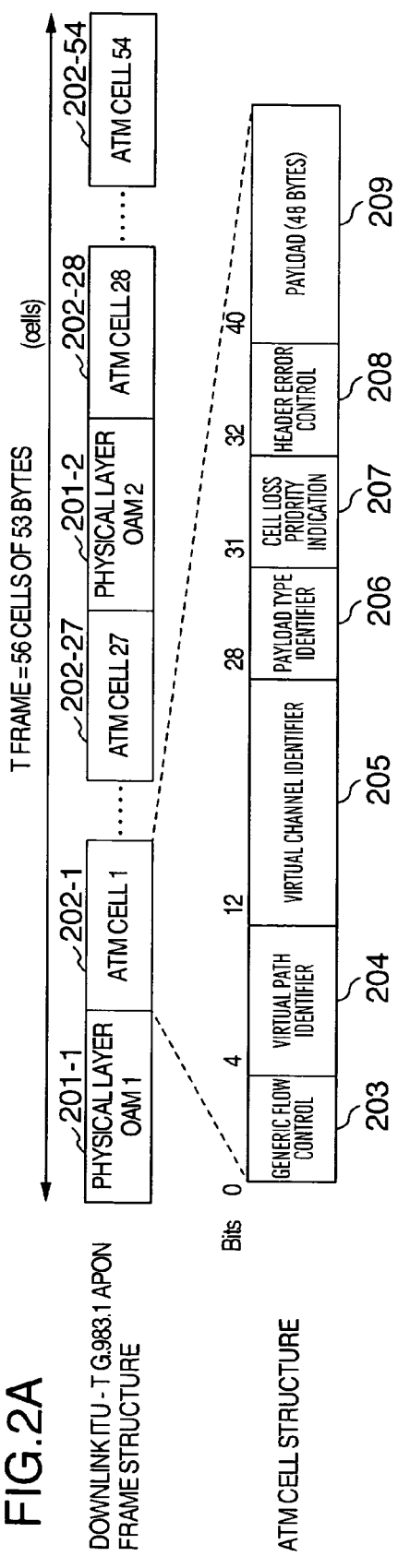

Normally, multiple optical network units (below abbreviated as "ONU") in a passive optical network system (below abbreviated as a "PON system") share bandwidth, and then the entire bandwidth in the downlink direction is limited; and for this reason, accompanying the transfer of a large quantity of data, there inevitably occurs flow congestion and data delays, so because of this, the originator of the present invention made repeated investigations to provide a method and an apparatus comprising a storage function in a passive optical network system making it possible to avoid as far as possible duplicate transfers of data and to improve the utilization factor of the downlink bandwidth, and in particular to avoid, as far as possible, duplicate transfers of data making exclusive use of a comparatively large bandwidth, such as audiovisual data and large data packages, and to greatly improve the utilization factor of the downlink bandwidth.

First Embodiment

Hereinafter, an explanation will be given specifically of a passive optical network system of Embodiment 1 of the present invention, on the basis of FIGS. 1 to 4.

FIG. 1 is a structural frame diagram of a passive optical network system 200 having a storage function of Embodiment 1 of the present invention. In PON system 200, there are included an optical line terminal (below abbreviated as "OLT") 100 connected to a core network 102 which is connected to an IPTV server 101, an optical distribution network (below abbreviated as "ODN") 120 connected to OLT 100, and multiple optical network units (below abbreviated as "ONU") 130-1, 130-2, . . . , 130-N (N expressing a positive integer greater than 1; below named generically as "ONU 130") connected to ODN 120, and the like.

In ODN 120 therein, there is included an optical splitter 109. OLT 100 is located in a station terminal, and ONU 130, which is placed locally, shares an optical fiber located between OLT 100 and optical splitter 109. The direction from OLT 100 toward ONU 130 is the downlink direction, so the opposite direction becomes the uplink direction. In the downlink direction, data are sent out using a broadcast method, whereas in the uplink direction, data are sent out using Time Division Multiple Access (TDMA). As shown in FIG. 1, in ONU 2, 130-2, of ONU 130, there are included an ODN interface 110-2 used in connecting to ODN 120, an ONU service processing module (i.e. an ONU data processing module) 111-2, a user terminal 112-2 used in connecting to an end user 2, 150-2, a microprocessor unit (MPU) 113-2, a read/write memory (RAM) 114-2, and a storage device 118-2 connected to ONU service processing module 112-2.

In ONU service processing module 111-2 therein, a data determination unit is included. As shown in FIG. 1, in the data determination unit, there are included modules such as an ID filtering module 115-2, a snooping module 116-2 according to RFC 2710 (Multicast Listener Discovery MLD)/RFC 1054 (Internet Group Management Protocol Snooping IGMP), and a control module 117-2. The IGMP module therein is an Internet group management protocol, being one subprotocol of the TCP/IP protocol family, which grants participation in the groupcast of the Internet main computer, i.e. the IP main computer is used in reporting group-related protocols to the mutually formed groupcast router. The Internet group management protocol IGMP manages IGMP form reports and receives suitable IGMP reports.

The data determination unit determines, based on LINK IDs (which will be explained in detail in writing below) held by the data, the data requiring storage from among all data transmitted to ONU 2, 130-2. The term "data requiring storage" stated here is stated to indicate data making exclusive use of a comparatively large bandwidth such as audiovisual data and large data packages. Subsequently, the data requiring storage determined by the data determination unit are stored in storage device 118-2.

PON system 200 stores, via a storage device 118 installed in ONU 130, data requiring storage which come from core network 102. In case end users 150-1, 150-2, . . . , 150-N (end user 150) of each ONU 130-1, 130-2, 130-N requested data stored in the storage device, there is no need to request again the transmission of these data, by repetition, to the IPTV server and the core network, since it is possible to transfer the data stored in the storage device directly to the end user. By proceeding in this way, it is possible to avoid duplicate transfers of data, in particular duplicate transfers of data such as audiovisual data and large data packages making exclusive use of comparative large bandwidth, and it is possible to improve the downlink bandwidth utilization factor and to reduce flow congestion and data delays.

FIG. 1 is merely a diagram making indications in detail regarding the situation of ONU 2, 130-2, but the present invention is not limited hereto, it being possible to select a unit, as the need arises, from among the other units ONU 130-1, 130-3, 130-4, . . . , 130-N and install the same data determination unit and storage device as for ONU 2, 130-2. FIG. 1 is merely a case of connecting one user to one ONU, but the present invention is not limited hereto, it being possible to connect multiple users to one ONU.

Next, a statement will be made regarding the LINK ID held by the data sent out to ONU 2, 130-2, on the basis of FIG. 2A to FIG. 2C.

FIG. 2A is a frame structure diagram of the downlink data of a PON (APON) system based on ATM with a downlink speed of 155.52 Mbps, wherein one physical layer OAM (PLOAM) cell is inserted for every 28 ATM cells and two physical layer PLOAM cells are included for each frame with 56 cells.

As shown in FIG. 2A, there are included PLOAM cells 201 and ATM cells 202 in the downlink APON frame. In the ATM cell, there are included a Generic Flow Control (GFC) item 203, a Virtual Path Identifier (VPI) 204, a Virtual Channel Identifier (VCI) 205, a Payload Type Identifier (PTI) 206, a Cell Loss Priority (CLP) indication 207, a Header Error Control (HEC) item 208, a payload 209, and the like. The Virtual Path Identifier (VPI) 204 therein is used in distinguishing between different ONU connections.

Figure 2B:
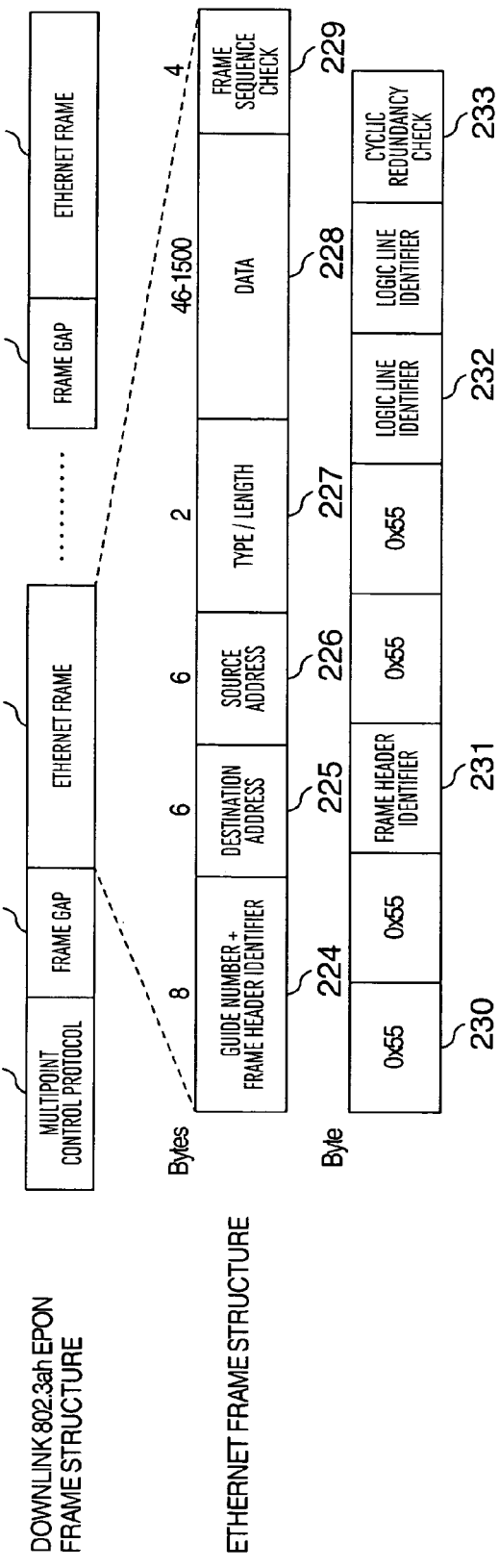

FIG. 2B is a frame structure diagram of the downlink data of a PON (EPON) system based on Ethernet with a downlink speed of 1.25 Gbps, wherein a Multi Point Control Protocol (MPCP) item 221 is located in the header part and Inter Frame Gaps (IFG) 222 are inserted between different Ethernet frames 223.

As shown in FIG. 2B, in the Ethernet frame, there are included a Destination Address (DA) 225, a Source Address (SA) 226, length/type item 227, data 228, a frame sequence check (FCS) item 229, a frame header identifier (SFD) guide number 224, and the like. In guide number 224, there are included four-byte 0x55 items 230, an SFD 231, a Logic Line Identifier (LLID) 232, a Cyclic Redundancy Check (CRC)

item 233, and the like. The logic line identifier (LLID) 232 therein is used in distinguishing between different ONU connections.

FIG. 2C is a frame structure diagram for downlink data of a GPON system with a downlink speed of 2.4 Gbps, physical layer control modules (PCBd) 241 therein having payloads 242 inserted with a period taken to be 125 μs.

As shown in FIG. 2C, in the aforementioned payloads 242, there are included an ATM cell section 243, GEM time division reuse, and data section 244. In data section 244, there are included GPON frame method (GEM) headers 246 and frame segments or full frames 247. And then, in GPON frame method (GEM) headers 246, there are included a Payload Length Identifier (PLI) 248, a port number 249, a Payload Type Identifier (PTI) 250, and a Header Error Control (HEC) item 251. A Virtual Path Identifier (VPI), not shown in the drawing, of the ATM cell, and port number 249 are used in distinguishing different ONU connections.

As mentioned above, the term "LINK ID" stated here expresses a unique identifier of an ONU or a service connection, with different ONUs or different service connections within one PON system having different LINK IDs. The LINK ID is applied to a PON system with a point-to-multipoint structure and by means hereof, it is ensured that, in the downlink transfer with a broadcast method, a specific ONU only receives the data affiliated with it.

Because of this, the LINK ID in an APON system is indicated using Virtual Path Identifier (VPI) 204. The LINK ID in an EPON system is indicated using Logic Line Identifier (LLID) 232. The LINK ID in a GPON system is indicated with the Virtual Path Identifier (VPI) and port number (Port ID) 249.

Figure 3:
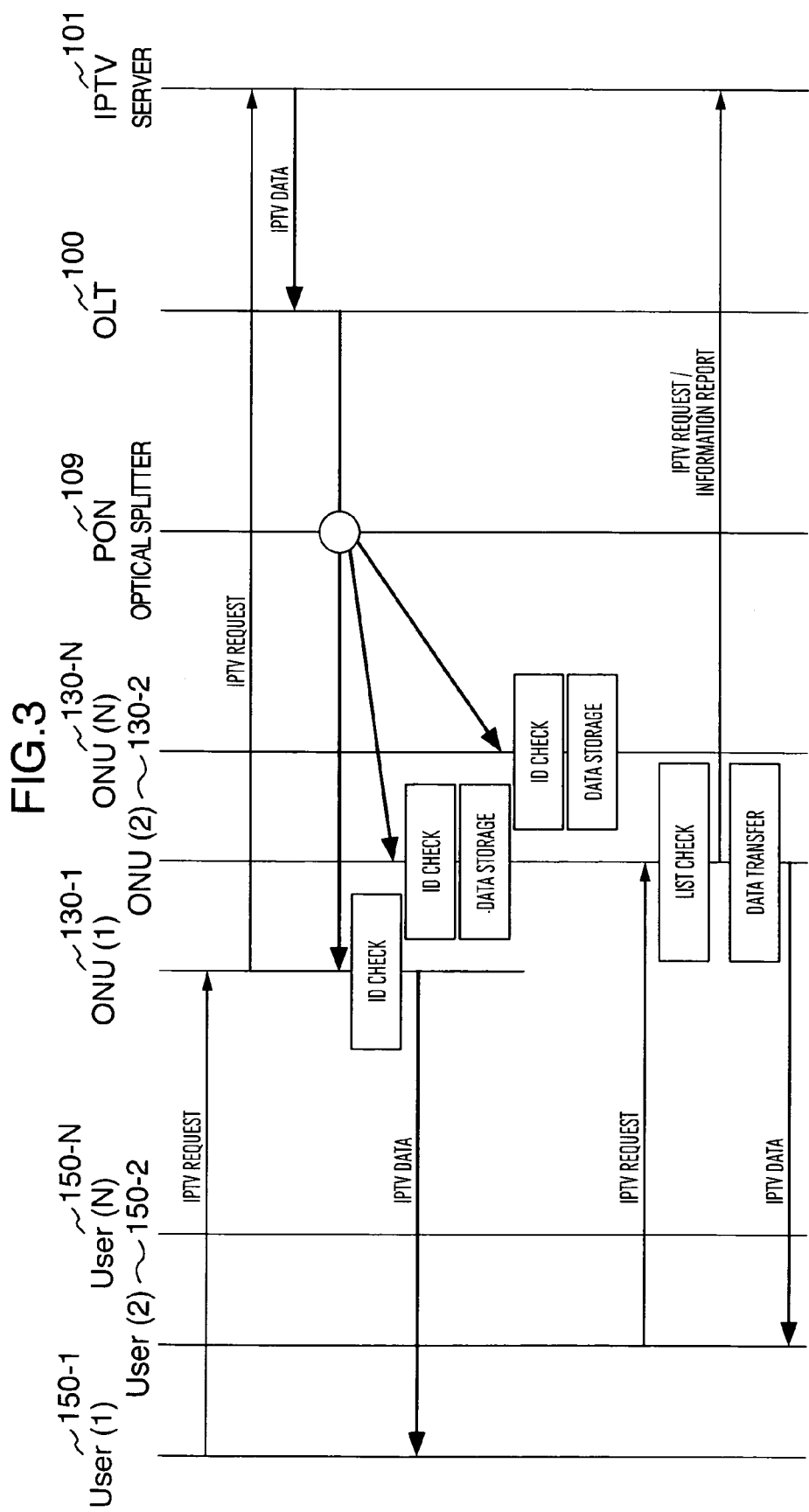
FIG. 3 is a transfer diagram for the basic information of a passive optical network system having the storage function of the first embodiment of the present invention.

Next, an explanation is given of the data determination unit citing an example based on FIG. 3 and FIG. 4, but the data determination unit in the ONU of the present invention is not limited to this only, it being possible to modify it as the need arises.

First, an explanation will be given regarding concepts pertaining to the three groupcast types mentioned hereinafter.

1. The groupcast with the groupcast LINK ID is one based on Layer 2 (data link layer) of the OSI (Open Systems Interconnection) Protocol. If the EPON system shown in FIG. 2B is taken as an example, an LLID 232 acting as the LINK ID of the groupcast in the EPON system is two times four bytes of guide number 224 within the Layer 2 frame structure.

2. The groupcast with the groupcast group is one based on Layer 3 (network layer) of the OSI Protocol.

3. The groupcast with groupcast IPTV data is one based on Layer 7 (application layer) of the OSI Protocol. Since IPTV data are a kind of application, the groupcast concept is one based on the application layer.

FIG. 3 is a transfer diagram for basic information of the PON system having the storage function of Embodiment 1 of the present invention. IPTV server 101 responds to an IPTV request of the user, sends IPTV data (e.g. audiovisual data) to the user, these IPTV data being transferred via the PON and at the very end reaching end user 150. In the downlink direction, the data arrive with a broadcast method from OLT 100 at multiple ONUs 130. If ONU 2, 130-2, shown in FIG. 1, is taken as an example, when the data arrive at ONU 2, 130-2, ID filtering module 115-2 of ONU 2, 130-2, selects the data that can be received by ONU 2, 130-2, from among all the data, on the basis of the LINK ID held by the data, e.g. by referring to the LINK ID comparison table shown in FIG. 4A.

Data not selected by ID filtering module 115-2 of ONU 2, 130-2, are abandoned. The data selected by ID filtering module 115-2 (i.e. the data judged to be data to be transmitted to ONU 2, 130-2,) are transmitted to control module 117-2 of ONU 2, 130-2. Control module 117-2 determines whether or not these data require storage on the basis of predetermined rules and, e.g. in case these data are judged to be audiovisual data according to the IP address and/or the port number, these data are determined to be data requiring storage and are subsequently stored in storage device 118-2.

Next, citing an example, an explanation will be given regarding the storage process of the control data of control module 117-2 of ONU 2, 130-2, Of course, the present invention is not limited hereto, and can be modified as the need arises.

In case the data selected by ID filtering module 115-2 of ONU 2, 130-2, are judged to have a unicast LINK ID, these data are sent to control module 117-2 of ONU 2, 130-2.

Control module 117-2 makes a check via a user request list to be subsequently described and judges whether of not these data have been requested by end user 2, 150-2, of ONU(2), 130-2. Supposing that it is the case that end user 2, 150-2, had requested these data, these data are directly transferred to end user 2, 150-2. At this point, it is both possible not to store these data, or to store these data at the same time as the transfer, and to update a content comparison table which will be described subsequently. Supposing that it is the case that end user 2, 150-2, had not requested these data, these data are stored in ONU storage device 118-2 and a subsequently described data storage list within the content comparison table is updated.

Supposing that it is the case that it is judged by ID filtering module 115-2 of ONU 2, 130-2, that these data have a groupcast LINK ID, these data are transmitted to MLD/IGMP snooping module 116-2 and it is judged whether or not ONU 2, 130-2, belongs to the groupcast group for these data. Supposing that it is the case that the ONU 2, 130-2, judged by MLD/IGMP snooping module 116-2 is judged not to belong to the groupcast of this group, these data are stored in the ONU storage device and the contents of the data storage list within control module 117-2 are updated. Supposing that it is the case that ONU 2, 130-2, judged by MLD/IGMP snooping module 116-2 judges that the data are data belonging to the group of this groupcast, it judges whether or not the user has requested these data, and supposing that it is the case that the user had requested these data, these data are directly transferred to the user, and at this point, it is possible both not to store these data or for these data to be stored at the same time as the transfer, and to update the content comparison table. Supposing that it is the case that the user has not requested these data, these data are stored in the ONU storage device and the contents of the data storage list inside the content comparison table are updated.

Subsequently, citing an example, an explanation will be given hereinafter regarding some types of table formats held by the optical network unit of Embodiment 1 of the present invention.

FIG. 4A shows an example of a LINK ID comparison table inside the ID filtering module of an optical network unit of the passive optical network system of Embodiment 1 of the present invention.

As shown in FIG. 4A, there is included a LINK ID comparison table 120 in ID filtering module 115, there being included three items such as "Data List", "LINK ID Corresponding to Data", and "Storage Possible in ONU?" in LINK ID comparison table 120. In the "Data List" item therein, all data having reached the ONU are preserved. In the "LINK ID Corresponding to Data" item, all data header part LINK ID values having reached the ONU are preserved. The "Storage Possible in ONU?" item indicates whether or not the data can be stored in the ONU.

FIG. 4B shows an example of an IP address/port number comparison table inside the data determination unit of an optical network unit of the passive optical network system of Embodiment 1 of the present invention.

As shown in FIG. 4B, there is also included an IP address/port number comparison table 121 in the data determination unit, there being included in IP address/port number comparison table 121 three items such as "Data List", "IP Address/Port Number Corresponding to Data", and "Storage Possible in ONU?". In the "Data List" item therein, all data having reached the ONU are preserved. In the "IP Address/Port Number Corresponding to Data" item, all data header part IP address/port number values having reached the ONU are preserved. The "Storage Possible in ONU?" item indicates whether or not the data can be stored in the ONU.

FIG. 4C is a content comparison table of the control module of an optical network unit of the passive optical network system of Embodiment 1 of the present invention. FIG. 4D is a content list of a storage device inside an optical network unit of the passive optical network system of Embodiment 1 of the present invention.

As shown in FIG. 4C and FIG. 4D, there is included a content comparison table 119 in control module 117, there being included two items such as a user request table and a data storage list in comparison table 119. In the user request table, the request information of the user is preserved. In the data storage list, information on the data stored in the storage device is preserved. The requests and data stored in content comparison table 119 are updated by user requests and updates of the data stored in the storage device, and by means hereof, it is possible to establish whether or not the user has requested the data through a check of content comparison table 119 and whether or not the requested data have been stored in the storage device.

Citing an example, as explained hereinafter, in case end user 150 has transmitted a new request, one record gets added in the user request list of content comparison table 119 and, supposing that it is the case that end user 150 has received the contents of the request, this request record is deleted. In case new data are stored in storage device 118, one newly recorded new data item gets added in the data storage list of content comparison table 119. Next, citing an example, there will be given an explanation regarding the situation in transferring stored data to the user, but the present invention is not limited only hereto.

Before end user 2, 150-2, of ONU 2, 130-2, carries out an IPTV request with respect to IPTV server 101, it is judged by a rights evaluation module (not shown in the drawing) whether or not the user is legitimate, and in case the user is illegitimate, it is prohibited to connect this user to the current passive optical network system. The aforementioned rights evaluation module can be installed in the ONU or can be installed in the OLT or the IPTV server.

In case end user 2, 150-2, of ONU 2, 130-2, has carried out an IPTV request with respect to IPTV server 101, this request information is analyzed by ONU service processing module 111-2, a comparison check is carried out through the data storage list of content comparison table 119, and it is judged whether the user requested data are already stored in storage device 118-2 installed in ONU 2, 130-2. Supposing that it is the case that these data are already stored in storage device 118-2, the data stored in storage device 118-2 are directly transferred to end user 2, 150-2. Supposing that it is the case that these data are not stored in storage device 118-2, the user request is sent to a suitable core network and IPTV server.

Second Embodiment

Based on FIG. 5 to FIG. 8, an explanation will hereinafter be given specifically regarding the data storage method of a passive optical network system of Embodiment 2 of the present invention.

Figure 5:
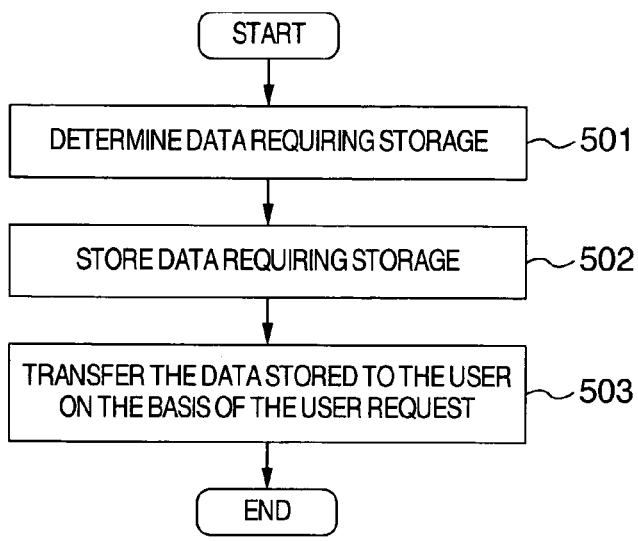
FIG. 5 is a flowchart of the storage of downlink data in the ONU storage device, in the second embodiment of the present invention.

FIG. 5 is a flowchart for storing, in the ONU storage device, data requiring storage in the downlink data, and for transferring data stored based on a user request.

First, by means of predetermined rules, data making exclusive use of a comparatively large bandwidth, such as e.g. audiovisual data and large data packages, are judged, from among all the data that have gradually been sent, to be data requiring storage (Step 501), on the basis of the LINK ID of the data. Thereafter, the previously determined data requiring storage are stored in storage device 118 of ONU 130 (Step 502). Supposing that it is the case that user 150 connected to ONU 130 had requested the data stored in storage device 118, the stored data are transferred directly to user 150 and if a request is made for these data to the server (e.g. IPTV server 101) for the second time, the need to transmit the data via core network 102 to ONU 130 disappears, making it possible, in this way, to avoid duplicate transfers of the data, improve the utilization factor of the broad bandwidth in the downlink and reduce flow congestion and data delays.

Figure 6:
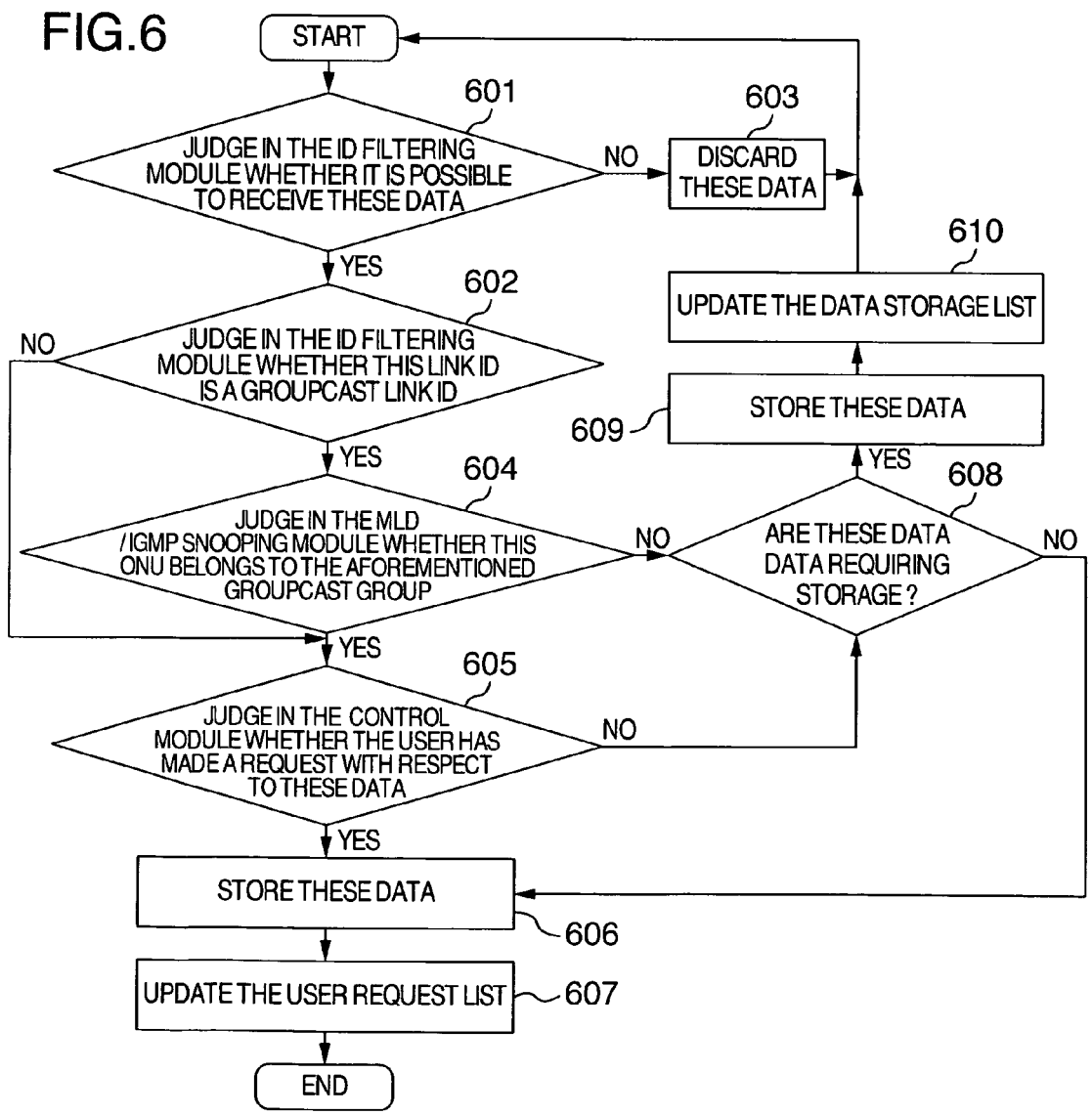
FIG. 6 is a flowchart of selection and storage of data in a location corresponding to the storage device, within the ONU of the second embodiment of the present invention.

FIG. 6 is a flowchart for selecting data that have gradually been sent to ONU 130, determining data requiring storage, and storing the data in a suitable location in storage device 118, corresponding to Steps 501 and 502 of FIG. 5.

First, when the data have been sent to the ONU, ID filtering module 115 judges, on the basis of the LINK ID held by the data, whether or not these data can be received by the ONU, i.e. selects the data which it is possible for the ONU to receive is selected from among all the data (Step 601). Supposing that it is the case that it is judged, in ID filtering module 115, that the data are data that are impossible for the ONU to receive, these data are abandoned (Step 603), and the process returns to Start. Supposing that it is the case that it is judged in ID filtering module 115 that the data in Step 601 are data that are possible for the ONU to receive, ID filtering module 115 judges whether the LINK ID of these data is a groupcast LINK ID (Step 602). Supposing that it is the case that it is judged that the LINK ID of these data is a groupcast LINK ID, these data are sent to MLD/IGMP snooping module 116 and MLD/IGMP snooping module 116 judges whether or not the current ONU is in the groupcast group affiliated with these data (Step 604). Supposing that it is the case that the current ONU does not belong to the group of this broadcast, the process proceeds to Step 608. Supposing that it is the case that it is judged in Step 602 that the LINK ID of these data is not a groupcast LINK ID but is a unicast LINK ID, the process proceeds to Step 605. In Step 605, it is judged in control module 117 whether or not the user has requested these data. Supposing that it is the case that the data have been requested, these data are directly transferred to the user (Step 606) and subsequently, the user request list is updated (Step 607). At this point, it is possible for these data to be stored in the storage device or for these data not to be stored. Supposing that it is the case that it is judged in Step 605 that these data have not been requested, the process proceeds to Step 608.

In Step 608, it is determined according to a predetermined rule whether or not these data are data requiring storage. It is judged whether or not these data are audiovisual data on the basis of e.g. the IP address and/or the port number, and supposing that it is the case that the data are audiovisual data, the same data are determined to be data requiring storage. Supposing that it is the case that these data are data not requiring storage, the process proceeds to Step 606. Supposing that it is the case that these data are data requiring storage, these data are stored in storage device 118 (Step 609), and subsequently, the data storage list is updated.

Figure 7:
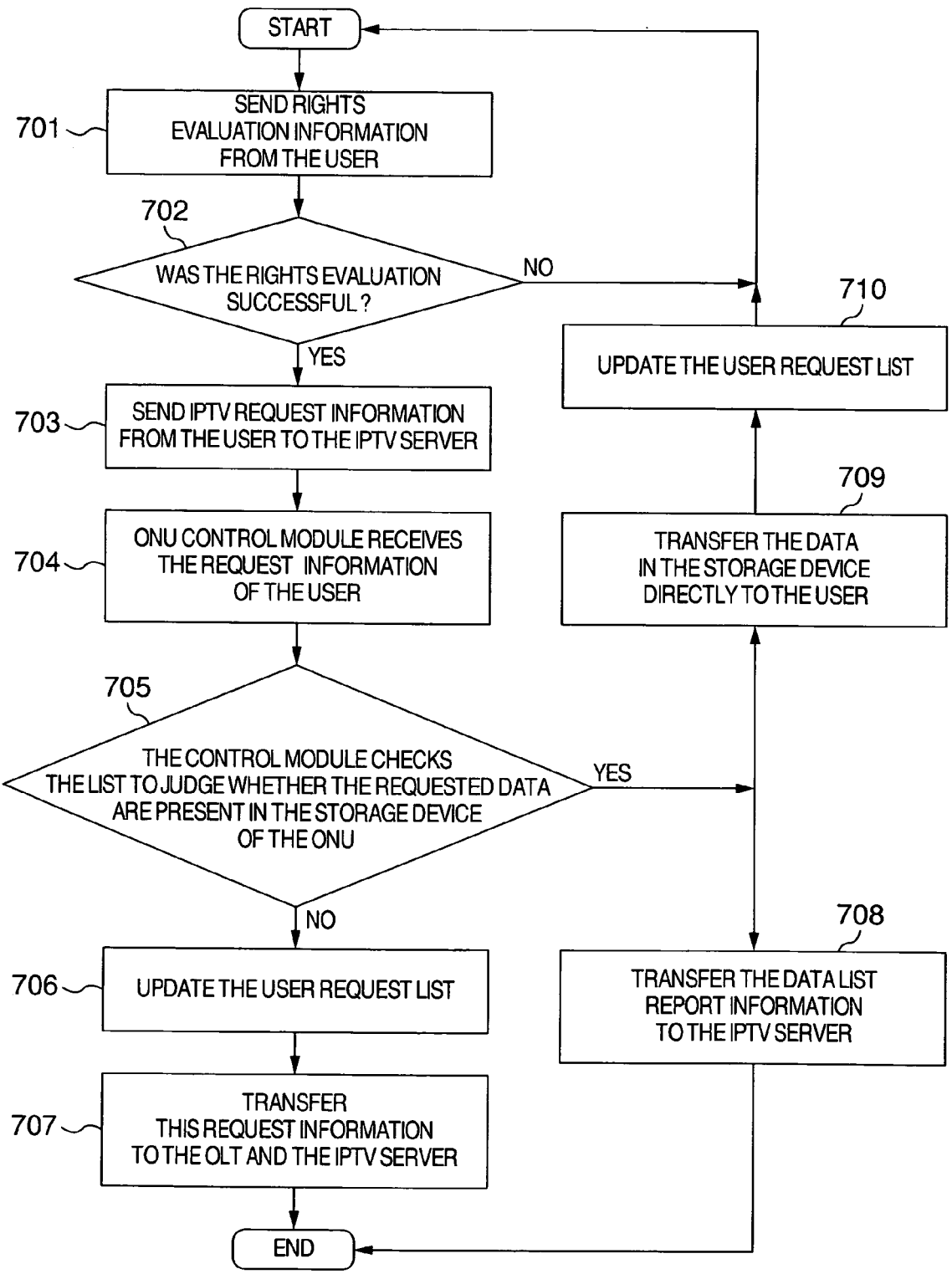
FIG. 7 is a flowchart of direct end user access to data inside the ONU storage device, in the second embodiment of the present invention.

FIG. 7 is a flowchart for the direct access by the end user to the data inside the ONU storage device and corresponds to Step 503 in FIG. 5.

As shown in FIG. 7, first, rights evaluation information is sent from the user (Step 701), a rights evaluation is performed in the rights evaluation module (not shown in the drawing), and the judged result is sent to ONU service processing module 111 (Step 702). Supposing that it is the case that the rights evaluation terminates with no success, the process goes back to Start. Supposing that it is the case that the rights evaluation terminated with a success, the process proceeds to Step 703.

In Step 703, the user sends an IPTV request to the IPTV server (Step 703), and then the IPTV request transmitted from the user is received in control module 117 of the ONU (Step 704), and subsequently, the process proceeds to Step 705.

In Step 705, control module 117 judges, through a check of the data storage list within content comparison table 119, whether the data requested by the user is stored in storage device 118 inside the ONU. Supposing that it is the case that these data are not stored therein, after the user request list within the content comparison table has been updated (Step 706), the user request information is sent to OLT and the IPTV server, and these data are requested (Step 707).

In case it was judged in Step 705 that these dated are stored in storage device 118, information on the data requested by the user is transferred and reported to IPTV server 101 (Step 708) and at the same, the data stored in storage device 118 are directly transferred to the user (Step 709) and the user request list within the content comparison table is updated (Step 710), the process thereafter being returned to Start.

In addition thereto, as for the rights evaluation processing with respect to the end user in Step 702, it is possible to carry out the processing separately in the ONU, the OLT, and the IPTV server. Citing an example, a description will be given hereinafter regarding this rights evaluation processing.

FIG. 8A shows a process in which the end user carries out the rights evaluation processing in ONU 2, 130-2. The user rights evaluation information is sent directly to ONU 2, 130-2, and thereafter, information about the success of the rights evaluation is sent from ONU 2, 130-2, to the user, and permission information of the IPTV server is sent to the user. Since the information flow in the other portions of FIG. 8A is the same as in FIG. 3, a detailed explanation thereof will be omitted here.

FIG. 8B shows a process wherein the end user carries out rights evaluation in OLT 100. The user rights evaluation information is sent to OLT 100, and thereafter, information on the success of the rights evaluation is sent from OLT 100 to the user and information on the IPTV request permission is sent to the user. At the same time, OLT 100 reports to ONU 2, 130-2, the information that the rights evaluation has succeeded, and as a result of this, ONU 2, 130-2, can process the IPTV request coming from end user 2, 150-2. The information flow in the other portions of FIG. 8B is the same as that in FIG. 3.

FIG. 8C shows a process in which the end user carries out processing of the rights evaluation in IPTV server 101. The user rights evaluation information is sent to IPTV server 101, and thereafter, rights evaluation success information is sent from IPTV server 101 to the user and IPTV request permission information is sent to the user. At the same time, IPTV server 101 reports information that the rights evaluation has succeeded to ONU 2, 130-2, and in this way, ONU 2, 130-2, can process the IPTV request coming from end user 2, 150-2. The information flow in the other portions of FIG. 8C is the same as that in FIG. 3.

Through the above-mentioned rights evaluation processing of the user, it is prohibited that an illegal user connects to the PON system and receives the IPTV data.

Third Embodiment

Based on FIG. 9 to FIG. 11, an explanation will hereinafter be given specifically regarding an OLT in a PON system of Embodiment 3 of the present invention.

Figure 9:
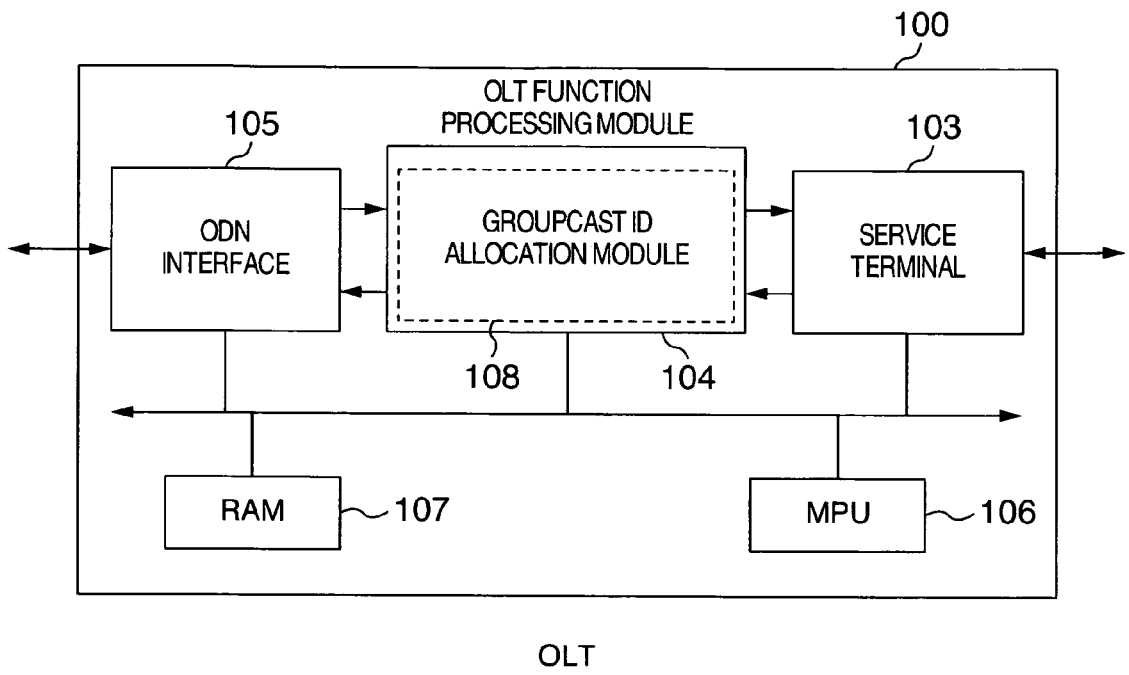
FIG. 9 is a structural frame diagram of an OLT having a function of allocating the data requiring storage to one groupcast LINK ID, in the third embodiment of the present invention.

FIG. 9 is a structural frame diagram of an OLT 100 having a groupcast LINK ID allocation module allocating groupcast LINK IDs with respect to the data. In OLT 100, there are mainly included an ODN interface 105, an OLT function processing module 104, a service terminal 103, a microprocessor unit (MPU) 106, a built-in read/write memory (RAM) 107, and the like. In the aforementioned OLT function processing module 104, there is included a groupcast LINK ID allocation module 108, and in this way, groupcast LINK IDs are allocated to data requiring storage (e.g. data making exclusive use of a comparatively wide bandwidth such as audiovisual data and large data packages). In case OLT function processing module 104 has detected data requiring storage coming from the IPTV server, one groupcast LINK ID is allocated to these data and these data are sent to all ONUs with a broadcast method.

By proceeding in this way, one groupcast LINK ID is ensured for all data requiring storage, and no matter whether the data sent from the IPTV server arrive with a broadcast method or with the unicast method, the data are sent downlink, all data requiring storage are received by all ONUs of the PON system, and are stored in a suitable storage device, of the selected ONU in which the storage device is installed. In this way, it is possible to avoid duplicate transfers of data making exclusive use of a comparatively large bandwidth such as audiovisual data and large data packages and to improve the utilization factor of the downlink bandwidth.

Figure 10:
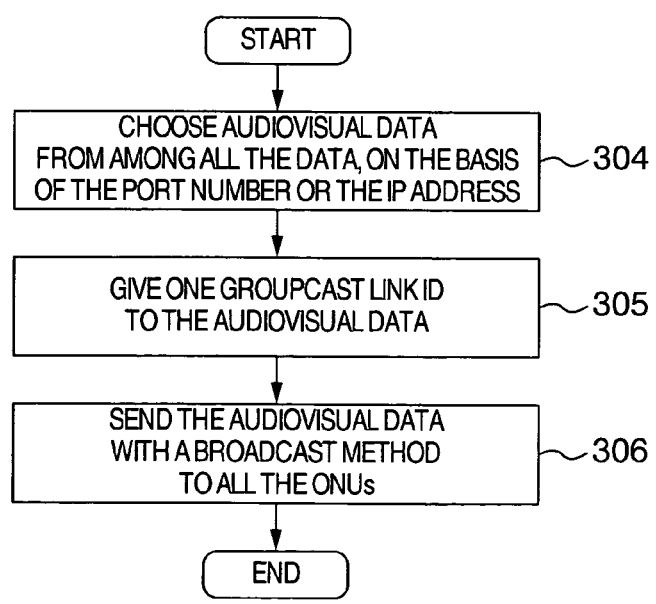
FIG. 10 is a flowchart wherein the OLT portion in the third embodiment of the present invention allocates one groupcast LINK ID to the audiovisual data, in the third embodiment of the present invention.

FIG. 10 is a flowchart in which OLT 100 allocates one groupcast LINK ID to data requiring storage, e.g. audiovisual data.

As shown in FIG. 10, in Step 304, from the sent data, data requiring storage are determined according to a predetermined rule, e.g. on the basis of the IP address and/or the port number, and audiovisual data from among all the data are determined to be data requiring storage. In Step 305, one groupcast LINK ID is allocated for the determined data requiring storage. In Step 306, all data to which the groupcast LINK ID have been allocated are sent to all ONUs in the PON system with a broadcast method.

In OLT 100 of FIG. 11, there is a groupcast LINK ID allocation module 108 allocating a groupcast LINK ID for data requiring storage, the diagram showing that ONU 130 transfers basic information of a PON system having storage device 118. If a comparison is made with FIG. 3, there is only one point in FIG. 11 which differs, i.e. the fact that there is groupcast LINK ID allocation module 108 in the OLT 100 portion in FIG. 11. Consequently, in case IPTV data sent from the IPTV server passes through OLT 100, groupcast LINK ID allocation module 108 allocates one groupcast LINK ID to these data, and by proceeding in this way, the IPTV data passing through the PON system all go downlink by means of the groupcast LINK ID, then reach all the ONUs 130, and can be received by the ONUs 130. The other portions of FIG. 11 are the same as in FIG. 3.

In the foregoing, detailed explanations were given regarding Embodiments 1 to 3 of the present invention, but the present invention is not limited hereto, and a technologist in the present domain would be able to carry out corrections here to, as the need would arise.

The present invention uses an ONU having a storage device within a PON system and, through the storage device of the ONU, stores data requiring storage such as data making exclusive use of a large bandwidth, e.g. audiovisual data, large data packages, and then, the need to send the data through an IPTV server and the core network for the second time disappears and these stored data are transferred directly to the user having made the request, and in this way, duplicate transfers of data in the downlink direction is reduced, the utilization factor of the wide downlink bandwidth is improved, and the response time of audiovisual services is improved.

The invention claimed is:

1. A method of implementing a storage function in a passive optical network PON system including an optical distribution network ODN, an optical line terminal OLT, and at least one optical network unit ONU, comprising:
   a data determination step of determining, from among data sent from the OLT to the optical network unit, the data requiring storage;
   a storage step of storing said data requiring storage in a storage device installed in said optical network unit;
   a judging step of judging whether a terminal connected to the ONU has transmitted a request with respect to said data, and in case no request has yet been sent with respect to said data, said data is stored in the storage device; and
   a sending step wherein if a request is sent with respect to said data, said data is sent directly to the terminal without storing said data in the storage device.

2. A method of implementing a storage function in a passive optical network system according to claim 1, including, in the data requiring storage in said data determination step, data judged to be audiovisual data on the basis of IP address and/or port number data.

3. A method of implementing a storage function in a passive optical network system according to claim 1, in said data determination step, there are further included: an ID filtering step of selecting, among all data that have gradually been transferred, data that can be received by the current optical network unit on the basis of data having a LINK ID; and a control step of storing, in case the data selected in said ID filtering step are determined to require storage, the same data in said storage device, and sending the stored data to said user, in case a user connected to the current optical network unit requests data already stored in said storage device.

4. A method of implementing a storage function in a passive optical network system according to claim 3, in said control step, judging whether or not requested data of a user connected to the current optical network unit are data requiring storage through a check of a user request list consisting of preserved user request information, as well as determining whether or not the user requested data are already present in said storage device through a check of the information data list in said storage device.

5. A method of implementing a storage function in a passive optical network system according to claim 4, in said data determination step, there is further included a MLD/IGMP snooping step;
   in case the data selected by said ID filtering step have a groupcast LINK ID, it is judged whether or not the current optical network unit belongs to the groupcast group of said data;
   moreover in said control step, in case the same unit does not belong to said groupcast group and said data are data requiring storage, these data are stored in said storage device;
   in case the data are stored in said storage device, said data storage list is updated.

6. A method of implementing a storage function in a passive optical network system according to claim 5, further including a rights evaluation step; judging, in the optical line terminal and/or the optical network unit, whether or not the user having sent the request is legitimate; and in case it is judged that the user is illegitimate, prohibiting the connection of this user to the current optical network unit.

7. A method of implementing a storage function in a passive optical network system according to claim 1, further including a groupcast LINK ID allocation step; in said optical line terminal, allocating a groupcast LINK ID to data requiring storage; and sending said data requiring storage with a broadcast method to all the optical network units.

8. A method of implementing a storage function in a passive optical network system according to claim 7, further including an audiovisual data determination step in said groupcast LINK ID allocation step; judging whether or not the IP address and/or the port number based on the data are for audiovisual data; and determining the data requiring storage.

9. An optical network unit in a passive optical network system, wherein
   said passive optical network (PON) system includes an optical distribution network ODN, an optical line terminal OLT, and at least one optical network unit ONU; and
   the at least one optical network unit among said optical network units includes a data determination unit for determining the data requiring storage from among the data sent from the OLT to the optical network unit, and a storage device storing the data requiring storage determined in said data determination unit, wherein
   it is judged whether a terminal connected to the ONU has transmitted a request with respect to the data requiring storage, and in case no request has yet been sent with respect to the data requiring storage, the data is stored in the storage device; and
   if a request is sent with respect to the data, the data is sent directly to the terminal without storing said data in the storage device.

10. An optical network unit in a passive optical network system according to claim 9, wherein said data requiring storage includes audiovisual data; and it is judged and determined whether or not the same data are audiovisual data on the basis of the IP address and/or the port number.

11. An optical network unit in a passive optical network system according to claim 9, wherein said data determination unit includes an ID filtering module selecting, among all the data that have gradually been transferred, the data that can be received by the current optical network unit, on the basis of the LINK ID held by the data; as well as a control module storing, in case the data chosen by said ID filtering module are determined to require storage, the concerned data in said storage device; and, in case the user connected to the current optical network unit has requested data already stored in said storage device, sends the stored data to said user.

12. An optical network unit in a passive optical network system according to claim 11, wherein the control module includes a user request list and a data storage list; request information of the user is stored in said user request list; information on data stored in said storage device is preserved in said data storage list; and it is determined whether or not, through a check of said data storage list, the data requested by the user are already stored in the storage device.

13. An optical network within a passive optical network system according to claim 12, wherein in said data determination unit, there is further included a MLD/IGMP snooping module;

in case the data chosen by said ID filtering module have a groupcast LINK ID, it is judged whether or not the current optical network unit belongs to the groupcast group of said data; in case the same unit does not belong to said groupcast group and when said data require storage, the data are stored in the storage device; and in case the data are stored in said storage device, said data storage list is updated.

14. An optical network unit within a passive optical network system according to claim 13, wherein there is further included a rights evaluation module; it is judged by means hereof whether or not the user is legitimate; and in case it is judged that the user is illegitimate, the connection of this user to the current optical network system is prohibited.

15. A passive optical network system, wherein there are included in said passive optical network (PON) system therein an optical distribution network ODN, an optical line terminal OLT, and at least one optical network unit ONU; there is, in said optical line terminal, a groupcast LINK ID allocation module allocating a groupcast LINK ID to data requiring storage; said data requiring storage are sent to all the optical network units with a broadcast method; there is included, in the at least one optical network unit among said optical network units, a data determination unit determining, on the basis of the LINK IDs existing in the data, the data requiring storage from among all the data sent to the optical network unit, and a storage device storing data requiring storage determined from said data determination unit.

16. A passive optical network system according to claim 15, wherein audiovisual data are included in said data requiring storage; an audiovisual data determination module is further included in said optical line terminal; and it is judged by means hereof whether or not these data are audiovisual data from the IP address and/or the port number based on the data.

17. An optical network unit in a passive optical network (PON) system including an optical distribution network ODN and an optical line terminal OLT, wherein said optical network unit includes an ODN interface receiving data from said optical line terminal, an ONU data processing module checking the LINK ID from the received data, and a user terminal by which data are sent to the user, and further includes a storage device storing the received data; said ONU data processing module, on the basis of indications and information of the LINK ID corresponding to data stored in said storage device, validates data requiring storage from among said received data; said storage device stores the data validated by said ONU data processing module; and said user terminal sends said stored data.

18. An optical network unit in a passive optical network (PON) system including an optical distribution network ODN and an optical line terminal OLT, wherein said optical network unit includes a memory, an ODN interface receiving data from said optical line terminal, an ONU data processing module processing checks of LINK IDs from the received data, and a user terminal by which data are sent to the user, and further includes a storage device storing the received data; said ONU data processing module validates, on the basis of indications and information of a LINK ID corresponding to the data stored in said storage device, data requiring storage from among said received data; said storage device stores data validated in said ONU data processing module; said memory possesses a data list stored in said storage device; and in case there is a data transmission request from the user, said user terminal sends said stored data on the basis of said list.

* * * * *

UNITED STATES PATENT AND TRADEMARK OFFICE
CERTIFICATE OF CORRECTION

| | | |
|---|---|---|
| PATENT NO. | : 7,660,309 B2 | Page 1 of 1 |
| APPLICATION NO. | : 11/650428 | |
| DATED | : February 9, 2010 | |
| INVENTOR(S) | : Ikeda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this

Thirtieth Day of November, 2010

David J. Kappos
*Director of the United States Patent and Trademark Office*